United States Patent [19]
Sekula

[11] 3,816,956
[45] June 18, 1974

[54] ARTICLE FOR CATCHING INSECTS

[76] Inventor: Roseann Sekula, 4800 W. Kennedy Blvd., Tampa, Fla. 33609

[22] Filed: June 16, 1972

[21] Appl. No.: 263,698

[52] U.S. Cl. ............................................... 43/114
[51] Int. Cl. .............................................. A01m 1/14
[58] Field of Search ............................ 43/114, 116

[56] References Cited
UNITED STATES PATENTS
2,911,756  11/1959  Geary .................................. 43/114

Primary Examiner—Robert Peshock
Assistant Examiner—Daniel J. Leach
Attorney, Agent, or Firm—Robert F. Ruemeli

[57] ABSTRACT

A tape for catching insects, particularly roaches and the like, is initially in the form of a roll with both sides of the tape being coated with pressure sensitive adhesives, one for mounting the tape to a floor or other supporting surface and the other preferably provided with a bait for attracting and holding an insect. Protective tapes cover each of the adhesively coated faces of the tape or, alternatively, only the insect entrapping adhesive may be covered with a protective tape. In use, the protective tape, if any, covering the mounting adhesive is removed, the tape is preferably positioned along the normal path of the insects to be caught, and the protective tape on the insect entrapping adhesive is removed, whereupon an insect coming upon the tape is entrapped by the exposed adhesive.

8 Claims, 3 Drawing Figures

PATENTED JUN 18 1974  3,816,956

ARTICLE FOR CATCHING INSECTS

BACKGROUND OF THE INVENTION

This invention relates to an article for catching insects.

Various articles in common use for eliminating insects include adhesively coated tapes hung from a ceiling for catching flies and other similar insects, and flypaper having an adhesively coated face for holding an insect and an opposite uncoated face received on a floor or table. However, both such tapes and flypaper have a common disadvantage in that their adhesively coated surfaces will easily adhere to any surface they contact as may easily happen if the tape is blown against a wall or a breeze turns over the flypaper. To avoid the likelihood of common flypaper being inadvertently overturned by a breeze or other means, the paper is normally provided in relatively large sheets and cannot be conveniently used in narrow spaces where roaches and other insects are often found. Additionally, a roach or other similarly large insect only partially trapped on flypaper may drag and possibly overturn a small piece of flypaper and cuase it to adhere to the floor or other surface, possibly damaging the surface.

BRIEF DESCRIPTION OF THE INVENTION

The invention, in brief, is directed to an article for catching insects. A first face of the article is preferably adhesively coated for mounting the article on a supporting surface for ready removal therefrom while leving the surface intact. A second face of the article is provided with means, preferably in the form of an adhesive, for entrapping an insect thereon, and this surface may be provided with a suitable bait if desired. One or both of the adhesively coated faces of the tape may be provided with protective covers which are removed before using the main tape. The article is preferably a tape provided in the form of a roll from which a desired length of tape may be cut.

It is an object of this invention to provide a new and useful article adapted to be received on a surface such as the floor, wall, cabinet or the like, for disposing of an insect, the article including a body having first and second faces, the first face having provision for securely mounting the body on a surface for removal from the surface while leaving the surface substantially intact; and the second face having provision for retaining an insect thereon. Related objects include the body in the form of a flexible tape adapted to be secured to an irregualr surface along a normal path of the insect to be entrapped; a pressure sensitive adhesive for mounting the body to retain it and the entrapped insect in place and providing for ready removal of the body from the surface while leaving the surface substantially intact; an adhesive for securely retaining the entrapped insect on the body; and a bait for attracting the insect onto the entrapping adhesive and retaining the insect thereon until it is securely retained by the adhesive. Another related object includes provision of a protective covering over at least one of the adhesives prior to intended use of the article; the body being in the form of a tape and the covering comprising a second tape generally coextensive with the insect entrapping face of the main tape, thereby forming a composite tape; and the composite tape being initially in the form of a roll with the covering tape outermost.

These and other objects and advantages of the invention will be apparent from the following descriptions and the accompaning drawing.

DETAILED DESCRIPTION

Figure 1:
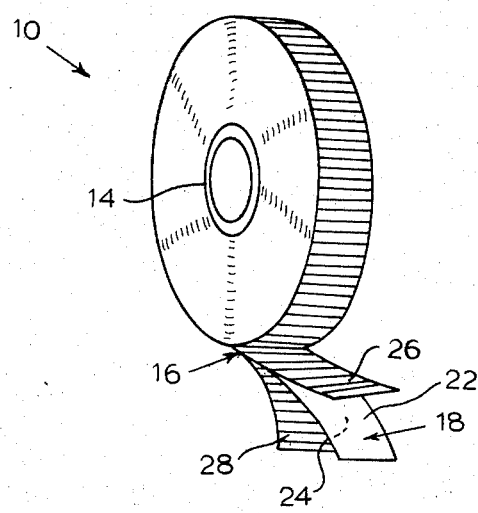
FIG. 1 is a schematic, perspective view of a preferred embodiment of the invention.

Referring to FIG. 1 of the drawing, a roll of tape 10 includes a core 14 about which a composite tape 16 is wound with a free end of the tape extending from the roll. Composite tape 16 includes a body or main tape 18 having opposite faces 22 and 24. Both of these faces preferably include pressure sensitive adhesives, face 22 having an adhesive for adhering to a supporting surface, and face 24 having an insect entrapping adhesive, as will be more fully described later. As illustrated in FIG. 1, the face 22 is covered by a protective tape 26 and the other face 24 is covered by a protective tape 28, the protective tapes perferably being corrugated transversely of the longitudinal axis of the tape and secured to the main tape by the adhesive on the adjacent face thereof, thereby providing for ready removal of the protective tapes from the associated faces of the main tape.

Figure 2:
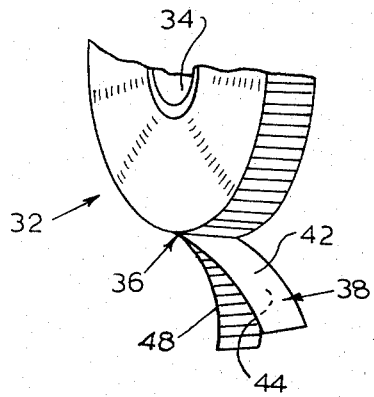
FIG. 2 is a fragmentary, schematic perspective view, similar to FIG. 1, but illustrating another embodiment of the invention.

FIG. 2 illustrates another embodiment of the invention wherein a roll of tape 32 includes a core 34 about which a composite tape 36 is wound with a free end of the tape extending from the roll. As shown in FIG. 2, the composite tape 36 includes a body or main tape 38 having one face 42 preferably provided with a pressure sensitive adhesive adapted to releasably adhere to a wall, floor, or other supporting surface as will be described later. An opposite face 44 of the main tape 38 is preferably provided with a pressure sensitive adhesive suitable for holding an insect, as previously mentioned with reference to FIG. 1. In FIG. 2, only the insect entrapping face 44 of the main tape 38 is provided with a protective tape 48. When in roll form the mounting adhesive of the face 42 releasably adheres to the outer face of the protective tape 48, and the composite tape 36 is wound on the roll 32 so that the protective tape 48 is outermost.

Figure 3:
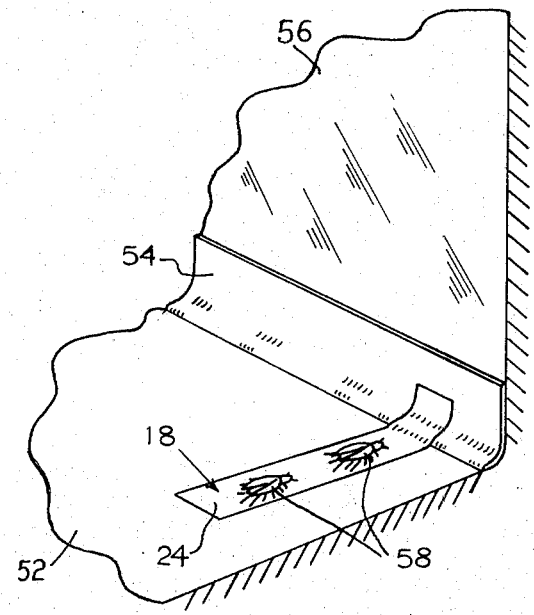
FIG. 3 is a fragmentary view of a portion of a floor and wall, with the invention in use thereon.

FIG. 3 illustrates the use of the tape and is applicable to either embodiment but is numbered with reference to the embodiment of FIG. 1. The main tape 18 is shown placed on a floor 52 and extending across an irregular surface in the form of a curves baseboard 54 at the junction of the floor 52 and a wall 56. In installing the tape a desired length of the composite tape 16 is cut from the roll 10 and the protective tape 26 is removed from the adhesively coated mounting face 22 of the main tape 18. With the protective tape 28 (not shown in FIG. 3) facing upwardly, the tape 18 is positioned proximate a normal path of an insect 58 to be caught, whereupon the pressure sensitive adhesive on the face 22 of the main tape 18 is pressed against the floor 52 and baseboard 54 to hold the tape in place. The protective tape 28 may then be removed from the face 24 of the main tape 18, thus exposing the insect entrapping pressure sensitive adhesive of the face 24. After an insect, such as a roach 58 has been entrapped on the face 24, the mounting adhesive on the face 22 prevents the insect from moving the tape. The tape 18 may now be pulled from the supporting surface as by peeling it from the floor 22 and baseboard 54, whereupon the face 24 of the tape 18 may be folded upon itself so that opposite portions of the face 24 adhere to each other with the roach within the doubled portion of the tape, whereupon the tape may be suitably discarded.

By way of specific example, the main tape 18 or 38 is preferably approximately 1½ inches wide and of any suitable material such as paper or cloth of sufficient strength to be handled as described, and compatible with the adhesives. The adhesive on faces 22 or 42 for securing the main tape to the supporting surface may be of any suitable type such as that used on pressure sensitive masking or packing tapes. The adhesive for entrapping the insect may be of any suitable type such as that normally used on common flypaper or tapes, and is preferably a glucose and glue mixture as sugar is a suitable bait for roaches and the like. The protective tapes 26, and 28 or 48 may be of any suitable material such as paper or plastic having sufficient strength to be readily removed from the adjacent adhesive and compatible with the associated adhesive and capable of releasably adhering thereto, and corrugated as previously discussed.

Thus, a tape for catching insects is provided in convenient roll form with at least one protective tape covering an insect entrapping adhesive on a face of the main tape to facilitate installation of the tape. The main tape is releasably adhesively mounted on a supporting surface by a suitable adhesive on its opposite face to retain the tape in place whereupon the protective tape is removed.

While this invention has been described and illustrated with reference to particular embodiments in a particular environment, various changes may be apparent to one skilled in the art, and the invention is therefore not to be limited to such embodiments or environment, except as set forth in the appended claims.

I claim:

1. An insect entrapping article adapted to be received on a surface such as a floor, wall, cabinet, or the like, for disposing of an insect, the article comprising a body having first and second faces, the first face being an adhesive securing means for mounting the body on the surface, and for ready removal of the mounted body from the surface while leaving the surface substantially intact, and the second face being an adhesive entrapping means for retaining an insect thereon, and a protective cover releasably secured over the adhesive of one of the faces for removal prior to mounting the article.

2. An article as set forth in claim 1 in which the protective cover is corrugated.

3. An article as set forth in claim 1 in which the body is flexible to facilitate mounting of the body on an irregular surface, and in which the securing means is a pressure sensitive adhesive.

4. An article as set forth in claim 1 in which the entrapping means is a pressure sensitive adhesive and includes a bait for attracting the insect to the second face.

5. An article as set forth in claim 1 including a pair of protective covers, one releasably secured over the adhesive of each of said faces, for removal prior to use of the article.

6. An article as set forth in claim 1 in which the body is a flexible tape adapted to be secured to an irregular surface along a normal path of the insect to be entrapped, the first and second faces being opposite faces of the tape, the securing means comprising a pressure sensitive adhesive for retaining the tape and the entrapped insect in place thereon, the entrapping means comprising a pressure sensitive adhesive for securely retaining the entrapped insect on the tape and further comprising a bait for attracting the insect onto the tape and retaining the insect thereon until the insect is securely retained on the tape by the adhesive on the second face, and in which the tape is sufficiently thin to permit an insect intended to be entrapped thereon to crawl onto the adhesive of the second face.

7. An article as set forth in claim 6 in which the cover is a second tape corrugated transversely of the first said tape and generally coextensive with the second face, thereby forming a composite tape, and in which prior to the intended use of the article, the composite tape is in the form of a roll, the second tape outermost, and the pressure sensitive adhesive of the first face releasably adheres to said second tape for release therefrom upon unwinding the roll.

8. An article as set forth in claim 6 including a second protective cover, said covers being tapes generally coextensive with said first tape and corrugated transversely of the first said tape and one releasably secured to the adhesive of the first face, and the other to the adhesive of the second face.

* * * * *